United States Patent
Gramann

(10) Patent No.: US 9,520,719 B2
(45) Date of Patent: Dec. 13, 2016

(54) RELUCTANCE MOTOR

(71) Applicant: Schaeffler Technologies AG & Co. KG, Herzogenaurach (DE)

(72) Inventor: Matthias Gramann, Renchen (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 492 days.

(21) Appl. No.: 13/964,349

(22) Filed: Aug. 12, 2013

(65) Prior Publication Data

US 2013/0328420 A1 Dec. 12, 2013

Related U.S. Application Data

(63) Continuation of application No. PCT/DE2012/000074, filed on Jan. 31, 2012.

(51) Int. Cl.
*H02K 19/20* (2006.01)
*H02J 3/36* (2006.01)
*H02K 19/10* (2006.01)

(52) U.S. Cl.
CPC ............ *H02J 3/36* (2013.01); *H02K 19/103* (2013.01); *H02K 2201/12* (2013.01)

(58) Field of Classification Search
CPC ........ H02K 16/00; H02K 1/24; H02K 19/103; H02K 1/146; H02K 1/187; H02K 37/06; H02K 37/02; H02K 37/04; H02K 19/06; H02K 7/103; H02K 2201/12
USPC ............. 310/46, 12.15, 216.075, 43, 44, 45, 49,310/106, 168, 12.17, 49.17, 156.02
See application file for complete search history.

(56) References Cited

U.S. PATENT DOCUMENTS

| | | | | |
|---|---|---|---|---|
| 3,483,406 A | * | 12/1969 | Kojima | H02K 37/08 310/268 |
| 3,775,626 A | * | 11/1973 | Burgbacher | H02K 19/103 310/162 |
| 3,806,744 A | * | 4/1974 | Abraham | H02K 37/06 310/49.19 |
| 5,485,046 A | * | 1/1996 | Kaplan | H02K 19/103 310/114 |
| 5,773,910 A | * | 6/1998 | Lange | H02K 1/27 310/156.02 |
| 5,942,828 A | * | 8/1999 | Hill | H02K 19/103 254/114 |
| 6,700,272 B1 | * | 3/2004 | Lindner | H02K 1/12 310/166 |

(Continued)

FOREIGN PATENT DOCUMENTS

| CA | 2692732 | 2/2009 |
|---|---|---|
| CN | 1171174 | 1/1998 |

(Continued)

*Primary Examiner* — Thomas Truong
(74) *Attorney, Agent, or Firm* — Volpe and Koenig, P.C.

(57) ABSTRACT

A reluctance motor having a rotor and a stator that has a wound core, around which a stator coil is wound and which is open on one side and has legs, said legs being arranged around the periphery and forming spaced-apart pairs of legs. Multiple rotor teeth which are distributed around the periphery and periodically establish a magnetic flux between the legs radially engage between the legs. In order to positively change the characteristic curve of the magnetic flux of the legs and teeth, the teeth continuously form an area overlap with the legs in the direction of rotation of the rotor in accordance with the angle of rotation.

12 Claims, 2 Drawing Sheets

(56) References Cited

U.S. PATENT DOCUMENTS

| | | | |
|---|---|---|---|
| 7,459,822 B1 * | 12/2008 | Johnson | H02K 1/246 310/166 |
| 2007/0120435 A1 * | 5/2007 | Laskaris | H02K 1/12 310/178 |
| 2011/0304233 A1 * | 12/2011 | Meyer | H02K 1/2753 310/156.02 |

FOREIGN PATENT DOCUMENTS

| | | | | |
|---|---|---|---|---|
| DE | WO 2010076081 A2 * | 7/2010 | | H02K 1/2753 |
| WO | 9919861 | 4/1999 | | |
| WO | 2007143827 | 12/2007 | | |

\* cited by examiner

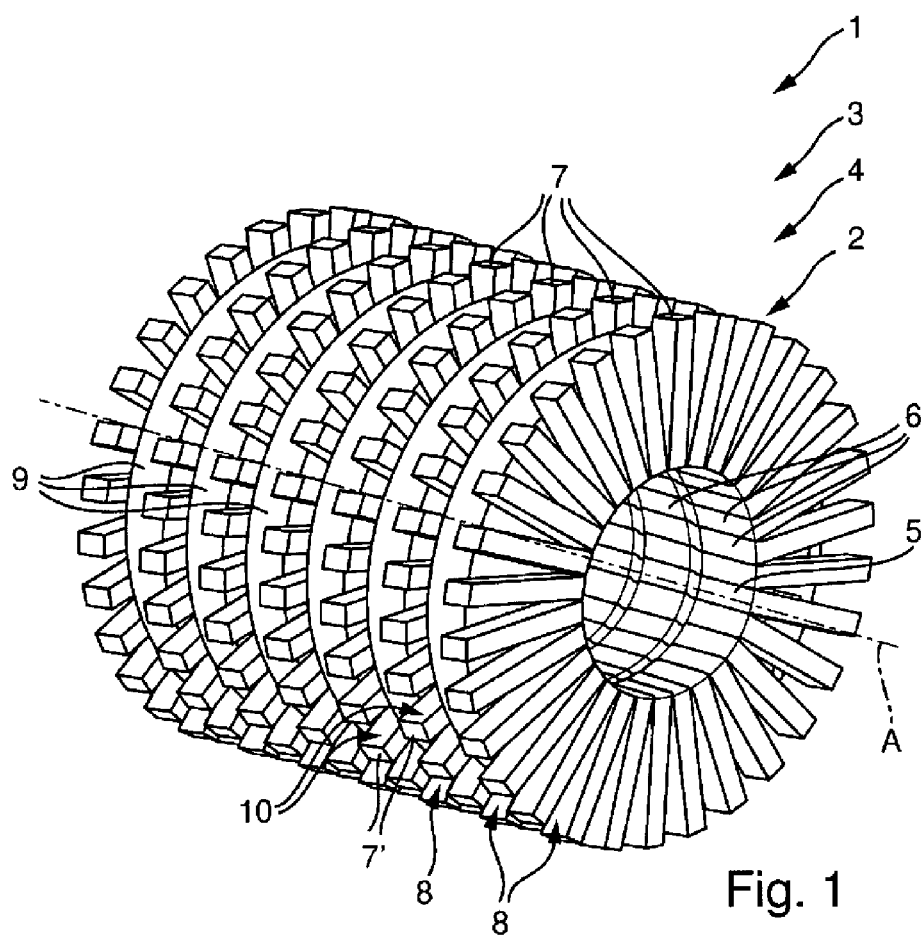
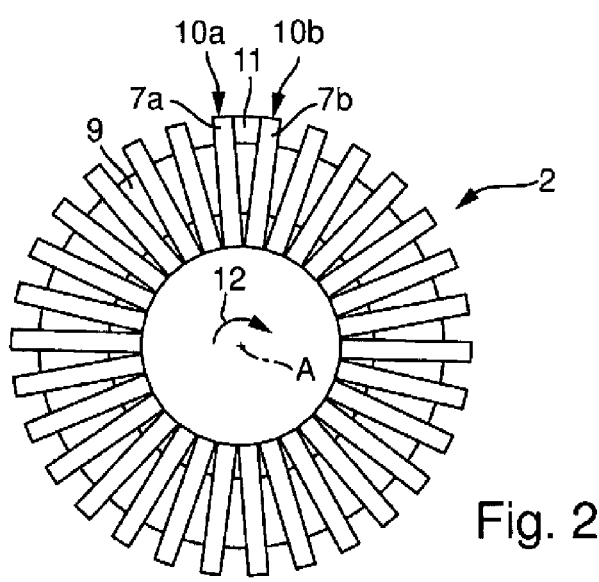

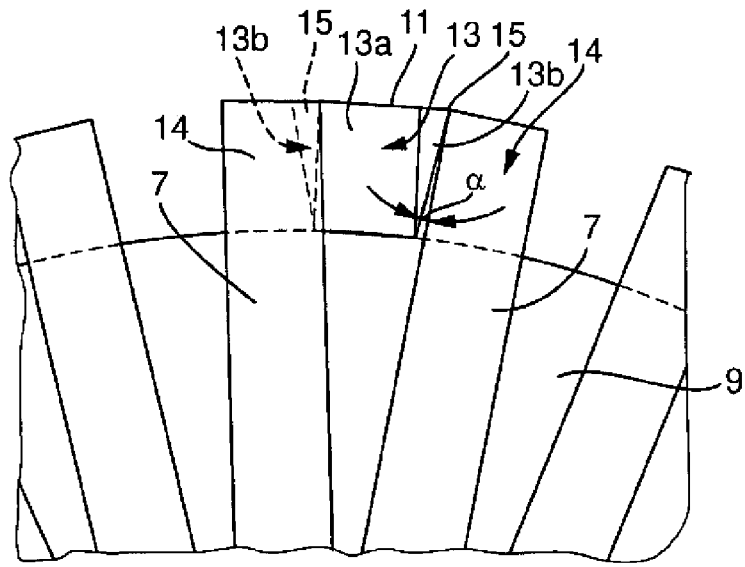
Fig. 3
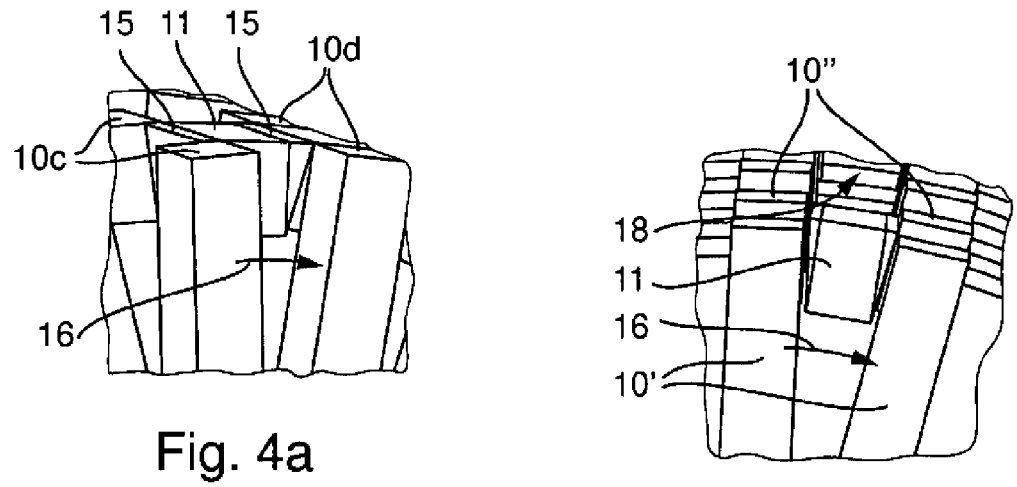
Fig. 4a
Fig. 4b
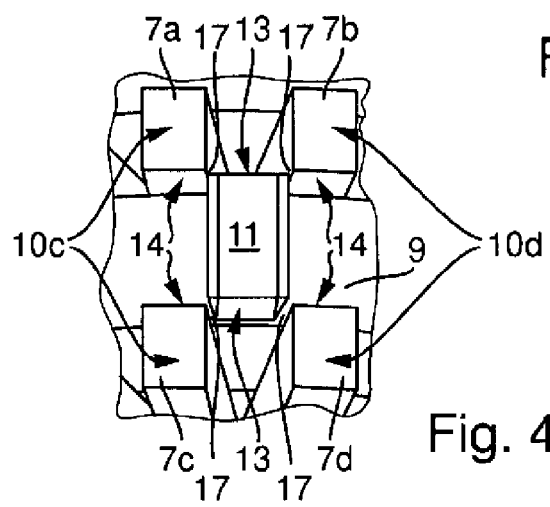
Fig. 4c

RELUCTANCE MOTOR

INCORPORATION BY REFERENCE

The following documents are incorporated herein by reference as if fully set forth: International Application PCT/DE2012/000074, filed Jan. 31, 2012; and German Patent Application No. 102011010879.3, filed Feb. 10, 2011.

BACKGROUND

The invention relates to a reluctance motor comprising a rotor and a stator that has a wound core, around which at least one stator coil is wound and which is open to one side, and has legs, said legs being arranged at the periphery and forming respectively spaced-apart pairs of legs, with multiple teeth of the rotor, distributed over the periphery, radially engaging between the legs, periodically establishing a magnetic flux between said legs.

A generic reluctance motor is known for example from WO 1999 019 861 A1 in the form of a transversal flux machine. Here, the stator is formed from several stator coils arranged side-by-side along the rotational axis of the rotor, wound around the wound core. The wound core comprises several pairs of legs that are spaced-apart legs, with these pairs of legs, in order to form a phase, axially enclose a stator coil between each other and radially outside form an open magnetic circuit by positioning the legs apart from each other. In order to form multiple phases several stator coils are arranged axially along the axis of rotation under separation by legs distributed over the periphery. The magnetic flux between the legs of a pair of legs is generated by rotating the stator coil and subjecting it to electricity by teeth of the rotor distributed over the periphery, which axially rotate in (to the space) between the legs of a pair of legs, forming two air gaps.

In principle, the control of the reluctance motor occurs via the switch-on periods of the electricity acting upon the phases. This leads to the fact that the establishment of the magnetic field must be synchronous with the change of the magnetic circuit. The change of the magnetic circle occurs by a relative motion of the flux deflectors in the form of legs and teeth in reference to each other. Here, at the beginning of the closure at one each of the multiple magnetic circuits a steep development of momentum occurs and thus steep and acute characteristic curves of the magnetic flux develop over the angle of distortion of the rotor. This may lead, among other things, to an undesired noise development. This way, particularly at higher rotations, a precise control of the stator coils with regards to timing is aggravated. In particular in multi-polar reluctance motors extremely high requirements must be set to mechanic tolerances in order to minimize tolerance-related errors occurring in addition to the errors of controlling.

SUMMARY

The objective of the invention is therefore to improve a reluctance motor such that flatter characteristic curves develop and particularly in multi-polar reluctance motors an improved control can be achieved. In particularly, a lower noise development shall be achieved as well.

The object is attained in a reluctance motor comprising a rotor and a stator that has a wound core, around which at least one stator coil is wound and which is open to one side, and has legs, said legs being arranged at the periphery and forming respectively spaced-apart pairs of legs, with multiple teeth of the rotor, distributed over the periphery and radially engaging between the legs, periodically establishing a magnetic flux between said legs, and in the travel direction of the rotor the teeth establish a continuously forming area overlap with the legs in the travel direction of the rotor, depending on the angle of rotation. By the area overlap, continuously increasing with the angle of rotation of the rotor in reference to the stator, for example, in the form of overlap areas angularly off-set in reference to each other in the circumferential direction, an overlap in the form of a step function can be avoided if the legs and teeth are aligned radially straight towards the outside, due to the axis of rotation. This way, continuously established magnetic flux and momentums develop, which can be controlled easier and show low tolerance sensitivity so that the electric control of the stator coils is facilitated.

The embodiment of the flux deflectors, teeth and/or legs, immediately influences the characteristics curve of the magnetic flux, which for example by the continuous establishment of the overlap areas, particularly at their inclining and declining flanks, is embodied less steep and overall wider, thus allowing to improve the control times and the noise behavior. For example it is possible by a targeted selection of the geometry of the flux deflectors to beneficially design the opening and closing of the magnetic circuits. Furthermore, the characteristics lines are influenced such that the peak maxima are shifted towards greater angles of distortion. The work of the magnetic circuits performed remains at a similar level as the magnetic circuits with an increasing angle of rotation in rapidly increasing overlaps of the overlap areas.

The use of the overlap areas overlapping continuously depending on the angle of rotation is particularly advantageous in transversal flux machines. Here, the flux deflectors, embodied as teeth and generating the magnetic flux between the legs of a pair of legs axially distanced in reference to each other, can be embodied wedge-shaped, seen in the circumferential direction. By the angle of the wedges the legs and teeth overlap first radially at the outside, with here with increasing angles of rotation of the rotor in reference to the legs the overlapping area continuously increasing in order to then, after exceeding the maximum overlapping area with a maximum magnetic flux, continuously falling again.

The embodiment of the wedge shape at the teeth can be provided by additionally provided teeth, essentially exhibiting an originally rectangular cross-section in the circumferential direction, using additionally fastened flux deflectors. Alternatively the wedge shape of the teeth can be embodied at the flux deflectors, preferably formed from metal sheets placed side-by-side in the shape of a ring fastened at the rotor, with teeth distributed over the periphery. Here, the wedge shape at the teeth may be provided in one piece, with each tooth per se may be formed from several metal sheets provided with wedge-shaped formations placed side-by-side.

According to the invention, the reluctance motor can be provided as an internal rotor or an external rotor, with in a preferred external rotor the wound core comprising legs of a pair of legs embodied radially U-shaped towards the outside, with radially from the outside the wedge-shaped embodied teeth, at the rotor expanded radially inwardly and distributed over the periphery in the circumferential direction preferably in the same number as the pairs of legs, engaging radially between the legs and the teeth and the legs each mutually form axially facing overlap areas, which continuously increase and reduce with an increasing angle of rotation.

According to a particularly beneficial exemplary embodiment the reluctance motor is embodied as a multi-phase motor. For example, a transversal flux machine comprises several phases arranged along an axis of rotation of the rotor with one stator coil each, which is formed by a level of legs distributed over the periphery and allocated to the wound core. The legs are here connected to each other radially at the inside, so that depending on the switching of the stator coils the legs, located axially opposite each other and enclosing the coil to be subjected to electricity, form a pair of legs, and the magnetic circuit of this pair of legs is closed by a tooth engaging radially outside into its legs. Here, it has proven advantageous for the legs of the wound core to be off-set in the circumferential direction along the axis of rotation. They may be off-set in reference to each other such that an angular distance between the axially frontal and axially rear legs of the wound core is evenly compensated by the legs arranged axially along the axis of rotation. This leads to the development of an even momentum beyond the rotation of the rotor by forming magnetic flux when the stator coils of the individual phases are axially subjected to cyclically circulating electricity.

BRIEF DESCRIPTION OF THE DRAWINGS

The invention is explained in greater detail based on the exemplary embodiment shown in FIGS. 1 to 4. Shown here are:

FIG. 1 a 3D-view of a stator of a reluctance motor embodied as a transversal flux machine, FIG. 2 a front view of the stator of FIG. 1 with one tooth of a rotor, FIG. 3 a detail of FIG. 2, FIGS. 4a to 4c detailed illustrations of the stator of FIGS. 1 to 3 with the tooth of the rotor.

DETAILED DESCRIPTION OF THE PREFERRED EMBODIMENTS

FIG. 1 shows the stator 2 in a 3D-view with a reluctance motor 1, embodied as a transversal flux machine 3, not completely shown, in the form of an external rotor 4. The stator 2 is connected in a torque-proof fashion, not shown, to a housing component or the like. The wound core 5 is preferably composed from a plurality of soft-magnetic flux deflectors 6, connected to each other, and comprises over its periphery soft-magnetic legs 7, distributed over the periphery and axially distanced from each other, which form leg areas 8, distributed over the periphery and axially distanced from each other, with the stator coils 9 being axially arranged between each of them. Two legs 7', each arranged on the same periphery and enclosing a stator coil 9 axially between them, form a pair of legs 10.

The rotor arranged about the stator 2, not shown, and rotating about the axis of rotation A comprises soft-magnetic flux deflectors, aligned radially inwardly, in the form of teeth, which are distributed over the periphery and form levels of teeth, respectively engaging between the legs 7' of the pair of legs 10 distributed over the periphery and along the axis of rotation A. Here, at a respective angular rotation of the rotor, one tooth each forms a closed magnetic circuit with the legs 7' of a pair of legs 10, at which a magnetic flux develops when the corresponding stator coil 9 is subjected to electricity. In the exemplary embodiment shown the legs 7 are linearly arranged along the axis of rotation A. However, they may also be arranged rotated over the periphery such that the legs 7 of the individual leg areas 8 are evenly rotated in reference to each other along the axis of rotation A and assume positions between a divisional section of the circular pitch of legs 7 distributed over the periphery.

FIG. 2 shows the stator 2 of FIG. 1 in a frontal view with a single tooth 11 of the teeth of the rotor arranged distributed over the periphery. The tooth 11 is embodied wedge-shaped in the circumferential direction and is arranged in FIG. 2 in the circumferential direction between two legs 7a, 7b of the pairs of legs 10a, 10b, adjacent in the circumferential direction, so that the magnetic circuit of none of the pairs of legs 10a, 10b is closed and thus none or only a negligible magnetic flux develops. In another rotation of the rotor and thus the tooth 11 in the direction of the arrow 12 about the axis of rotation A, the tooth 11 rotates into the pair of legs 10b and closes its magnetic circuit, with here a magnetic flux developing when the allocated stator coil 9 is subjected to electricity.

FIG. 3 shows the overlap areas 13, 14 of the tooth 11 and the legs 7 located therebehind. The overlap area 13 is embodied trapezoidal by the wedge-shaped embodiment of the tooth 11, by further areas 13b being added to the rectangular embodiment of the tooth 11 with the rectangular base area 13a via the additional flux deflectors 15 provided at both sides of the tooth 11 in the circumferential direction. The overlap areas 14 of the legs 7 and the legs located axially opposite thereto, not shown, forming a pair of legs, remain unchanged. In the original state of the tooth 11 with a rectangular base area 13a the base area 13a and the overlapping areas 14 of the axially opposite legs overlap discontinuously. This way the characteristic curve of the magnetic circuit developing in the form of a magnetic flux, changing over the angle of rotation along the overlap, is embodied rapidly increasing and then steeply declining. Thus, with the stator coil 9 being subjected to electricity, via the teeth 11 which are distributed over the periphery, accordingly strong accelerations act upon the rotor due to the magnetic moments developing. This causes a poor control of the rotor and thus the electrification of the stator coils depending on the angle of rotation and this can lead to undesired noise development. By providing additional areas 13b, at an increasing rotation, due to the angle α developing by the wedge shape of the tooth 11 not a sudden but a continuous embodiment of the overlap areas develops between the overlapping areas 13, 14, which show a considerably flatter characteristics curve of the magnetic moment, accelerating the rotor less jerkily so that an angular control of the electrification of the stator coils 9 can occur easier and more precisely, for example from 1° to 2°, and less noise develops.

FIGS. 4a to 4c each show a detail of the reluctance motor 1 of FIG. 1 in detail. FIG. 4a shows a diagonal view of the tooth 11 with the flux deflectors 15 expanded wedge-shaped in the circumferential direction between the pair of legs 10c, 10d following each other in the direction of rotation in the direction as indicated by the arrow 16. FIG. 4b shows a view into the path 18 of pairs of legs 10', 10" arranged behind each other along the axis of the rotation A (FIG. 1) to form different phases of the reluctance motor 1. Here, the tooth 11 moves in the direction of the arrow 16 following the axis of rotation A. FIG. 4c shows a detail of the pairs of legs 10c, 10d arranged in the circumferential direction, formed from the legs 7a, 7b on the one hand and 7c, 7d on the other hand. The legs 7a, 7b, 7c, 7d accept wedge-shaped teeth of the rotor, distributed over the periphery as well as the stator coil 9, with the tooth 11 being shown as an example. Depending on the angle of rotation of the rotor, the magnetic circuits form over the periphery between the teeth, such as tooth 11, and the legs 7a, 7b, 7c, 7d of the pair of legs 10c, 10d with a maintenance of the air gap 17 and the formation of overlap areas 13, 14.

LIST OF REFERENCE CHARACTERS 1 reluctance motor
2 stator
3 transversal flux machine
4 external rotor
5 wound core
6 flux deflector
7 leg
7a leg
7b leg
7c leg
7d leg
7' leg
8 leg level
9 stator coil
10 pair of legs
10a pair of legs
10b pair of legs
10c pair of legs
10d pair of legs
10' pair of legs
10" pair of legs
11 tooth
12 arrow
13 overlap area
13a base area
13b additional area
14 overlap area
15 flux deflector
16 arrow
17 air gap
18 path
A axis of rotation
α angle

The invention claimed is:

1. A reluctance motor comprising:
a rotor including a plurality of teeth distributed over a periphery of the rotor; and
a stator including at least one wound core open at one side and wound by a stator coil, and a plurality of legs arranged over a periphery of the stator and forming pairs of legs spaced apart from each other in an axial direction,
wherein the plurality of teeth of the rotor are arranged between the pairs of legs in the axial direction,
the plurality of teeth of the rotor periodically generating a magnetic flux between the pairs of legs, and
the plurality of teeth being wedge-shaped when viewed in the axial direction such that leading edges of the teeth gradually overlap with the pairs of legs as the plurality of teeth move in a traveling direction of the rotor, and the leading edges of the teeth are angled relative to trailing edges of the pairs of legs such that an acute angle is formed between a leading edge and a trailing edge when the leading edge begins to overlap with the trailing edge.

2. The reluctance motor according to claim 1, wherein the motor comprises a transverse flux machine.

3. The reluctance motor according to claim 2, wherein the plurality of teeth each include a pair of flux deflectors mounted at sides of the teeth and forming a part of the wedge shape.

4. The reluctance motor according to claim 1, wherein the rotor is an external rotor.

5. The reluctance motor according to claim 1, wherein the motor is formed from several phases arranged along an axis of rotation (A) of the rotor with respectively one of the stator coils and the legs distributed over the periphery and forming leg levels, which limit the stator coils from each other, forming the wound core.

6. The reluctance motor according to claim 5, wherein the legs of the phases are off-set in a circumferential direction along the axis of rotation (A).

7. The reluctance motor according to claim 1, wherein the plurality of teeth are positioned such that the leading edge begins to overlap with the trailing edge at a first radial portion of the trailing edge prior to overlapping with a second radial portion of the trailing edge.

8. The reluctance motor according to claim 7, wherein the first radial portion is distal and the second radial portion is proximal with respect to the stator coil.

9. The reluctance motor of claim 1, wherein the plurality of teeth each include a rectangular base and a pair of wedge-shaped flux deflectors at opposing sides of the rectangular base.

10. A reluctance motor comprising:
a rotor including a plurality of teeth distributed over a periphery of the rotor; and
a stator including at least one wound core open at one side and wound by a stator coil, and a plurality of legs arranged over a periphery of the stator and forming pairs of legs spaced apart from each other in an axial direction,
wherein the plurality of teeth of the rotor are arranged between the pairs of legs in the axial direction,
the plurality of teeth of the rotor periodically generating a magnetic flux between the pairs of legs, and
the plurality of teeth including leading edges that are angled relative to trailing edges of the pairs of legs and respectively begin to overlap with the trailing edges of the pairs of legs at first radial portions of the trailing edges prior to overlapping with second radial portions of the trailing edges as the plurality of teeth move in a traveling direction of the rotor, such that an acute angle is formed between a leading edge and a trailing edge when the leading edge begins to overlap with the trailing edge.

11. The reluctance motor according to claim 10, wherein the first radial portions are distal and the second radial portions are proximal with respect to the stator coil.

12. The reluctance motor of claim 10, wherein the plurality of teeth each include a rectangular base and a pair of wedge-shaped flux deflectors at opposing sides of the rectangular base.

* * * * *